United States Patent
Hesse et al.

(10) Patent No.: US 11,282,320 B2
(45) Date of Patent: Mar. 22, 2022

(54) METHOD AND APPARATUS FOR SORTING DISC-SHAPED OBJECTS

(71) Applicant: MUHLBAUER GMBH & CO. KG, Roding (DE)

(72) Inventors: Gunter Hesse, Drebach (DE); Andreas Reitinger, Waldmunchen (DE)

(73) Assignee: Mühlbauer GmbH & Co. KG, Roding (DE)

( * ) Notice: Subject to any disclaimer, the term of this patent is extended or adjusted under 35 U.S.C. 154(b) by 162 days.

(21) Appl. No.: 16/332,480

(22) PCT Filed: Aug. 28, 2017

(86) PCT No.: PCT/EP2017/071563
§ 371 (c)(1),
(2) Date: Mar. 12, 2019

(87) PCT Pub. No.: WO2018/050427
PCT Pub. Date: Mar. 22, 2018

(65) Prior Publication Data
US 2019/0236882 A1 Aug. 1, 2019

(30) Foreign Application Priority Data
Sep. 13, 2016 (DE) .......................... 102016217432.0

(51) Int. Cl.
*G07D 3/14* (2006.01)
*B65G 47/82* (2006.01)
*G07D 3/12* (2006.01)

(52) U.S. Cl.
CPC ............... *G07D 3/14* (2013.01); *B65G 47/82* (2013.01); *G07D 3/125* (2013.01)

(58) Field of Classification Search
CPC ........ G07D 3/14; G07D 3/125; G07D 11/237; B65G 47/82
(Continued)

(56) References Cited

U.S. PATENT DOCUMENTS 3,465,870 A  9/1969 Paulsen
4,167,949 A * 9/1979 Hashimoto .............. G07D 3/16
453/12
(Continued)

FOREIGN PATENT DOCUMENTS

DE         10213920      10/2003
DE       102010031298      1/2012
(Continued)

OTHER PUBLICATIONS

International Search Report prepared by the European Patent Office dated Nov. 24, 2017, for International Application No. PCT/EP2017/071563.
(Continued)

*Primary Examiner* — Jeffrey A Shapiro
(74) *Attorney, Agent, or Firm* — Sheridan Ross P.C.

(57) ABSTRACT

The invention relates to a device and a method for sorting disc-shaped objects, in particular coins. The device comprises a conveying device configured to convey individual disc-shaped objects along a conveyor path. A discharge unit comprising a pivotable diversion element serves to selectively discharge individual objects which are being conveyed along the conveyor path. The objects are discharged according to a previously determined classification for each object, in a classification system which differentiates between good parts and defective parts. In order to discharge an object, the diversion element is designed to be pivoted by means of a drive into the conveyor path such that, by means of the pivoting movement, the diversion element transfers a mechanical impulse to the object to be discharged. The impulse has, with respect to the direction of movement of the object at the time of the impulse transfer, both a perpendicular and an antiparallel impulse component. The impulse components are selected such that the impulse changes the direction of movement of the object, causing the
(Continued)

object to be discharged from the conveyor path. During the sorting of good parts and defective parts, only the conveyed objects which have been classified as good parts in accordance with the classification system are discharged by means of the diversion element.

26 Claims, 5 Drawing Sheets

(58) Field of Classification Search
USPC .......................................... 194/294, 342, 346
See application file for complete search history.

(56) References Cited

U.S. PATENT DOCUMENTS

| | | | | |
|---|---|---|---|---|
| 5,518,101 A * | 5/1996 | Simizu | ............... | G07D 3/14 194/317 |
| 5,577,589 A * | 11/1996 | Garcia Tinoco | ........ | G07F 7/005 194/204 |
| 5,865,673 A * | 2/1999 | Geib | ............... | G07D 3/128 453/10 |
| 6,644,456 B2 * | 11/2003 | Trenner | ............... | G07D 3/00 194/321 |
| 6,698,568 B2 * | 3/2004 | Nakajima | ............... | G07D 3/14 194/314 |
| 7,614,544 B2 * | 11/2009 | Trenner | ............... | G07F 1/047 194/346 |
| 10,089,812 B1 * | 10/2018 | Blake | ............... | G07D 9/008 |
| 2001/0040081 A1 * | 11/2001 | Smith | ............... | G07D 3/14 194/346 |
| 2007/0000749 A1 * | 1/2007 | Yamagishi | ............... | G07D 5/02 194/207 |
| 2007/0029159 A1 * | 2/2007 | Quattrini | ............... | G07D 3/14 194/302 |
| 2007/0144864 A1 * | 6/2007 | Harada | ............... | G07D 3/14 194/346 |
| 2010/0273409 A1 * | 10/2010 | Meyer-Steffens | ........ | G07D 3/14 453/4 |
| 2011/0130084 A1 * | 6/2011 | Trenner | ............... | G07F 1/02 453/63 |
| 2014/0187134 A1 * | 7/2014 | Stieber | ............... | G07D 3/14 453/4 |
| 2015/0228140 A1 * | 8/2015 | Martin | ............... | G07D 3/128 453/3 |
| 2017/0221294 A1 * | 8/2017 | Niizuma | ............... | G07D 5/08 |
| 2018/0012456 A1 * | 1/2018 | Kawabata | ............... | G06F 21/86 |

FOREIGN PATENT DOCUMENTS

| | | |
|---|---|---|
| DE | 102012100309 | 7/2013 |
| EP | 0314881 | 5/1989 |
| EP | 2241520 | 10/2010 |
| WO | WO 2012/083033 | 6/2012 |

OTHER PUBLICATIONS

Written Opinion prepared by the European Patent Office dated Nov. 24, 2017, for International Application No. PCT/EP2017/071563.
International Preliminary Report on Patentability prepared by the European Patent Office dated Jun. 22, 2018, for International Application No. PCT/EP2017/071563.

* cited by examiner

METHOD AND APPARATUS FOR SORTING DISC-SHAPED OBJECTS

CROSS REFERENCE TO RELATED APPLICATIONS

This application is a national stage application under 35 U.S.C. 371 and claims the benefit of PCT Application No. PCT/EP2017/071563 having an international filing date of 28 Aug. 2017, which designated the United States, which PCT application claimed the benefit of German Patent Application No. 10 2016 217 432.0 filed 13 Sep. 2016, the disclosure of each of which are incorporated herein by reference.

The present invention relates to a device as well as a method for sorting disc-shaped objects, in particular coins.

In the production of coins or other disc-shaped objects, in particular chips, tokens, jetons, medals or other similar objects, which in particular can be at least substantially of circular disc-shape, it is often necessary to inspect the produced objects as regards manufacturing defects and to perform a corresponding sorting into non-faulty objects, which are referred to as "good parts", and faulty objects, which are referred to as "defective parts", for quality assurance purposes. In this way it can be ensured that only good parts reach the trade, or, in the particular case of coins, into circulation. Further, it may also be useful to subject such objects to an inspection later, when they are already in use, in particular regularly, as regards damage that may have occurred in the meantime, or as regards their authenticity. This is particularly appropriate in the case of coins, since damaged or non-authentic coins, in particular counterfeit coins, must be regularly removed from circulation and replaced by new, genuine coins. In another application, good parts can be identified as objects of a particular object type, in particular as coins of a particular type or of a particular denomination within a type, while objects of a different object type, in particular of a different type or of a different denomination, can be identified as "defective parts". In this way, sorting by object type is possible.

Various sorting machines for sorting coins are known from the prior art. The publication DE 10 2012 100 309 A1 describes a device for handling coins which includes a sorting unit for selectively feeding the coins to at least two receiving containers. The sorting unit comprises a transport element with whose help the coins are transported in a transport direction. Further, the sorting unit has a first ejection element and at least a second ejection element, wherein the coins can be removed from the transport element with the help of the first ejection element and fed to the first receiving container. In a corresponding manner, the coins can be ejected from the transport element with the help of the second ejection element and fed to the second receiving container. As seen in the direction of transport, the ejection elements are arranged side by side and can in particular be constructed by means of solenoids which push the coins from the transport element in a direction which is perpendicular to their direction of movement in order to eject them selectively into the respective receiving containers.

The present invention is based on the problem of providing a device and a method for sorting disc-shaped objects, in particular coins, which enable an increase in the throughput of objects and in the duration of a continuous sorting operation of the device while keeping the likelihood of incorrect sorting low.

A solution to this problem is provided in accordance with the teaching of the independent claims by means of a device in accordance with claim 1 for sorting disc-shaped objects and a corresponding method in accordance with claim 19. Various embodiments and further developments of the invention are the subject of the dependent claims.

Accordingly, a first aspect of the invention relates to a device for sorting disc-shaped objects, in particular coins, value chips, tokens, jetons, medals, badges or the like. The device comprises a conveying device which is configured to convey individual disc-shaped objects along a conveying path. Further, the device comprises a removal unit with a pivotable diversion element for the selective removal of individual objects conveyed along the conveying path in dependence upon a prior assigning, to the objects, of a respective previously determined category within a classification, which distinguishes between good parts and defective parts. The diversion element is arranged to be pivoted into the conveying path by means of a drive in such a way that, for the removal of an object, it transfers a mechanical momentum to the object to be removed by means of the pivoting movement, which mechanical momentum has, with respect to the direction of movement of the object at the time of the momentum transfer, both a momentum component which is directed perpendicular thereto, as well as a momentum component which is directed anti-parallel thereto, which momentum components are chosen in such a way that the direction of movement of the object is changed by the momentum and the object is thereby removed from the conveying path. The removal unit is configured to effect a sorting of good parts and defective parts in such a way that only those of the conveyed objects are removed by means of the diversion element which have been classified as good parts according to the classification.

A "conveying device" in the sense of the invention is understood to be a device which is arranged to transport disc-shaped objects along a conveying path. A conveying device can preferably be implemented by means of a conveyor belt or at least a transport belt, but without being restricted to this.

A "diversion element" in the sense of the invention is understood to be a component which, from an initial position in which it does not reach into the conveying path, can be pivoted into the conveying path by means of a pivoting movement in order to transfer a mechanical momentum to objects conveyed along the conveying path. A diversion element can therefore in particular be constructed in the form of a mallet. Other forms of the component that do not have a circular symmetry with respect to a real or virtual pivot axis of the pivoting movement are also possible in principle.

The device in accordance with the invention makes it possible to easily carry out a sorting of the objects conveyed to the removal unit into good parts and defective parts. Because of the fact that here, in contrast to conventional methods, in which defective parts are usually removed from the conveying path while the good parts remain on the conveying path, only the good parts are removed from the conveying path, the homogeneity of the removed parts among each other is maintained even in the event of a malfunction or failure of the removal unit, so that, in this respect, it is impossible for incorrect sorting to occur.

The pivoting movement of the diversion element can be carried out very quickly, in particular by means of a motor drive, so that very high throughputs are possible during sorting, e.g. beyond 20 objects per second. The direction of the momentum transfer is chosen in such a way that the mechanical momentum of the object which is present due to the movement of the object along the conveying path is "reflected" at the diversion element and is added to the momentum additionally transferred by the pivoting movement of the diversion element to form a total resulting momentum so that this leads to a diversion of the object out of the conveying path and thus to a removal of the object. Thus, the kinetic energy of the object which is already present due to the conveying can be used for the removal, which enables a higher energy efficiency of the device compared with solutions according to which the kinetic energy required for the removal is to be provided exclusively by a diversion element. The removed objects can in particular be captured and collected by a collecting container arranged in the direction of the total momentum.

In the following, preferred embodiments of the device and their further developments are described, which, as far as this is not expressly excluded, can be combined, as desired, with each other and with the second aspect of the invention, which is directed to a corresponding method, as described below.

In accordance with a first preferred embodiment, the device further comprises an inspection unit which is arranged along the conveying path upstream of the diversion element and is arranged to inspect each of the objects conveyed along the conveying path using a sensor and, depending on the result of the inspection, to assign, to each of the conveyed objects, a category within the classification and to communicate these assigned categories to the removal unit. In this way, the device is enabled to carry out the assigning of a category to the objects within the classification by itself and thus to work autonomously and independently of external signal or data sources to provide this categorization information.

In accordance with a further preferred embodiment, an electric motor is provided to drive the diversion element, with the driven shaft of which the diversion element is coupled. The electric motor is preferably a servo motor and the removal unit further comprises a control unit which is arranged to control the servo motor by means of corresponding control signals in order to cause the diversion element driven by the servo motor to remove objects by means of the pivoting movement, which objects have been selectively classified as good parts, depending on the assigning of a category previously determined for the conveyed objects within the classification. Electric motors, in particular servo motors, offer the advantage that a precisely controlled adjustment of the pivoting movement is made possible so that the pivoting movement of the diversion element driven by the electric motor can be optimally adapted to the objects to be sorted, in particular to their dimensions, weight, material properties and conveying speed.

Accordingly, in accordance with a preferred further development, the control unit, in order to adapt the pivoting movement of the diversion element to the type of the objects to be sorted, can be configured in such a way that at least one, preferably all, of the following parameters of the pivoting movement can be adjusted: (i) a measure of the acceleration of the diversion element, or of the force which causes this; (ii) a measure of the final velocity, in particular the angular velocity, of the diversion element which has been reached after acceleration has taken place and before the diversion element has made contact with the object to be removed; (iii) a measure for determining the point in time for the start of the pivoting movement as a function of a previously detected position, along the conveying path, of the object to be removed, the measure in particular being able to be a time interval between the detection of the position and the start of the pivoting movement; (iv) a measure of the maximum deflection occurring during the pivoting movement from an initial position of the diversion element, the measure in particular being able to be a corresponding deflection angle.

A particularly high energy efficiency can be achieved by means of the interplay between the use of a pivoting movement instead of a linear movement for the removal, the driving of the diversion element by means of an electric motor and a control of the electric motor which has been optimized by means of the parameterization mentioned above, so that an uninterrupted long-term operation extending over many hours or days is made possible even at high sorting frequencies, without the device reaching the limits of its operating capabilities in the course of this. In the case of known linear drives, such as solenoids, on the other hand, rapid heating typically occurs at high frequencies, so that the operating limits of such drives are reached after a short period of time and thus either a costly cooling system or regular pauses are required.

In accordance with a further preferred embodiment, the device further comprises a trigger sensor that is configured to detect objects which are being conveyed along the conveying path to the removal unit and, if an object is detected, to output a trigger signal to the removal unit that indicates the detection. The removal unit is configured to pivot the diversion element into the conveying path in dependence upon the trigger signal and the assigning of a category within the classification to an object in order to selectively remove the object. In this way, the position of an object which is being moved along the conveying path towards the diversion element can be determined automatically by means of the trigger sensor and in particular, as a function of this, the optimum point in time for the start of the pivoting movement of the diversion element can be derived. In particular, the parameterization mentioned in connection with the immediately preceding embodiment can be used to determine the point in time for the start of the pivoting movement as a function of a previously detected position of the object to be removed along the conveying path. In a preferred variant, the trigger sensor is combined with the inspection unit to form a single component.

In accordance with a further preferred embodiment, the device further comprises a test sensor which is configured to detect whether an object which is intended to be removed in accordance with it having been assigned a category within the classification has, after reaching the diversion element, been correctly removed from the conveying path in accordance with at least one predetermined criterion and to output a test signal which indicates a correct removal and/or that a removal of the object from the conveying path has not taken place correctly. In the simplest case, the test criterion can consist in determining whether the object is still located on the conveying device after it has passed the diversion element. In this way it is possible to detect errors relating to the removal, where an object which is actually intended to be removed passes the diversion element without correctly being removed by it.

In accordance with a further preferred development, the device further comprises an evaluation unit, which in particular can coincide with the control unit. The evaluation unit is arranged to determine an absolute or relative frequency of occurrence of the test signals on the basis of the test signals output by the test sensor, and to output a fault signal if the frequency of occurrence exceeds a predetermined tolerance threshold, preferably a configurable tolerance threshold. The fault signal thus points to errors relating to the removal or a deviation beyond the tolerance threshold, and can therefore indicate a malfunction of the device.

In accordance with a further preferred embodiment the device further comprises a position sensor which is configured to detect a measure of the deflection of the diversion element and to output a corresponding position signal. The device is configured to return the diversion element to a predefined initial position on the basis of the position signal, from which predefined initial position its respective pivoting movements for the selective removal of objects from the conveying path take place. In this way, it is possible to recognize where the diversion element is currently located, and to return it in a targeted manner to its initial position, in particular in the context of a renewed initialization of the drive, for example when the sorting device is switched on. This is in particular helpful if the initial position is not defined in any other way, for example by means of a stop, but must be approached in a targeted manner via an appropriate control of the drive of the diversion element. In the simplest case, the position sensor is merely configured to determine whether the diversion element is already in the initial position.

In accordance with a further preferred embodiment, the diversion element has the shape of a cam, in particular similar to the typical shape of the cams of a camshaft of the engine of a motor vehicle. This shape of the diversion element is particularly suitable, since on the one hand its linear contour sections are well suited for the transfer of momentum to the intended surface section of the objects, because at least with smaller variations of the position of the point of contact with the objects to be removed, there are only negligible effects on the resulting total momentum of the objects. On the other hand, due to the circular symmetry at the round contour sections of the cam, unnecessary moments of inertia can be avoided, which promotes the easy movability of the diversion element and thus leads to this shape being particularly suitable for achieving high throughputs and high energy efficiency.

In accordance with a further preferred embodiment, at least on its surface section intended for the transfer of momentum to the objects, the diversion element has a contour that is free of edges, corners and projections. In particular, edges that delimit the surface section may be rounded for this purpose, if applicable. In this way, possible damage to the objects during the transfer of momentum from the diversion element to the object during the pivoting movement is specifically prevented.

In accordance with a further preferred embodiment, the diversion element is configured in such a way that its pivoting movement takes place about a real or virtual axis and that the surface portion of the diversion element which is intended for the transfer of momentum to the disc-shaped objects has, in a direction parallel to the axis, a height which is at least equal to the thickness of the disc-shaped objects which are intended for sorting. In this way, during the transfer of the mechanical momentum from the diversion element to the object that is to be removed, there is contact between the diversion element and the object over the entire thickness of the latter. This can also help to reduce the pressure on the object that is to be removed which arises during contact during the transfer of momentum and thus prevent possible damage to the object.

In accordance with a further preferred embodiment, the surface portion of the diversion element which is intended for the transfer of momentum to the objects to be removed is made of a material or coated with a material whose modulus of elasticity is lower than that of the objects intended for sorting. In particular, the modulus of elasticity may be significantly lower, preferably by at least one order of magnitude, than that of materials typically used in the production of coins, such as copper and/or nickel alloys. This also contributes to the prevention of possible damage during the transfer of momentum from the diversion element to the object to be removed.

In accordance with a further preferred embodiment, the conveying device has an alignment device for aligning the objects which have been conveyed to the diversion element along an alignment line extending along the conveying path. The alignment device is preferably constructed by means of a guide profile component, such as a guide plate. The diversion element is arranged offset with respect to this alignment line in such a way that, during its pivoting movement, a deflection from its initial position which is different from zero must first take place before the diversion element can come into contact with an object which is to be removed and which is aligned in this way in order to transfer the mechanical momentum. In this way, unintentional deflections of objects not intended for removal in accordance with their having been assigned a category within the classification, caused by contact with the diversion element, are easily avoided. Due to the offset arrangement of the diversion element with respect to the alignment line, even tolerances up to the non-zero deflection with respect to the position of the diversion element around its correct initial position are possible without such unintentional deflection occurring.

In accordance with a further preferred embodiment, the diversion element is configured in such a way that its surface section which is intended for the transfer of momentum to the objects already has a movement component directed against the conveying direction immediately before the contact with an object which is to be removed. In particular, in this way it is easily possible to deflect the objects to be removed by large angles, in particular by 90°, in relation to the direction of the conveying path for the purpose of the removal.

In accordance with a further preferred embodiment, the maximum deflection angle of the diversion element from its initial position achieved during the pivoting movement of the diversion element is at most 40 degrees, preferably at most 30 degrees, particularly preferably at most 20 degrees. In this way, the deflection can be limited to a small amount, which can be used for a faster return of the diversion element and thus for a higher throughput of objects during sorting. In addition, smaller deflection angles support the energy efficiency of the device and thus its ability to operate continuously for long periods of time.

In accordance with a further preferred embodiment, the device is arranged to sort 20 or more of the objects, preferably 25 or more of the objects, per second. Constructing the device in an appropriate manner may in particular include, in addition to the provision of a conveying device allowing appropriate conveying speeds to be achieved, constructing the drive of the diversion element with sufficient power for such frequent and rapid pivoting movements, the provision of suitably small deflection angles and/or the lowest possible inertia of the diversion element, as well as a control of the drive of the diversion element of suitably high frequency as well as, if necessary, an upstream inspection for assigning, to the objects to be sorted, a category within the classification.

In accordance with a further preferred embodiment, at least one further removal unit, preferably of the same type, is provided along the conveying path downstream of the removal unit for the selective removal of individual ones of the objects conveyed along the conveying path, in dependence upon at least two classes of the assigning of categories of the classification previously determined for the respective objects. In particular, one or more such further removal units can be used, in the sense of a subsequent sorting, to remove objects retrospectively which, although classified as good parts, have erroneously not been removed correctly by the upstream removal unit or units. On the other hand, this embodiment can also be used advantageously in order to achieve a sorting into more than two classes, whereby each of the removal units removes the objects which are assigned to a certain class of the classification.

For example, the objects could be sorted into different quality classes within the framework of the classification, so that each removal unit removes the objects assigned to a certain quality class and thus, in total, a sorting into the different quality classes can be achieved by means of the plurality of removal units.

A second aspect of the invention relates to a method of sorting disc-shaped objects, in particular coins, with the following steps: (i) conveying individual disc-shaped objects along a conveying path; and (ii) selectively removing, by means of a pivotable diversion element, certain ones of the objects conveyed along the conveying path, in dependence upon a prior assigning, to the objects, of a category within a classification, which distinguishes between good parts and defective parts. For the removal of an object, the diversion element is pivoted into the conveying path by means of a drive in such a way that it transfers a mechanical momentum to the object to be removed by means of the pivoting movement, i.e. dynamically and not only statically, as, for example, in the case of a diversion element which is stationary at the time of contact with the object. The direction of the momentum at the time of the transfer of momentum has both a momentum component which is directed perpendicular as well as a momentum component which is directed anti-parallel with respect to the direction of movement of the object, which momentum components are chosen in such a way that the direction of movement of the object is changed by the momentum and that this is thereby removed from the conveying path. The sorting of good parts and defective parts is carried out in such a way that only those of the conveyed objects are removed by means of the diversion element which have been classified as good parts in accordance with the classification.

In the following, preferred embodiments of the method and their further developments are described, which in turn can be combined in any desired way with each other and with the first aspect of the invention described above, as long as this is not expressly excluded. Since the method represents a working method which corresponds to the function of the device in accordance with the first aspect of the invention, what has been said above in relation to the device, in particular in relation to the respective corresponding embodiments and their further developments, applies to the method and its embodiments or further developments in a corresponding manner.

In accordance with a first preferred embodiment of the method, the method comprises, as further steps, a sensory inspection of the respective objects conveyed along the conveying path; an assigning of a category to the conveyed objects, depending on the respective result of their inspection, in the classification; and a communication of the classification category to a controller of the diversion element.

In accordance with a further preferred embodiment, a servo motor is used to drive the diversion element, which servo motor is controlled by means of appropriate control signals in such a way that the diversion element is caused to selectively remove, by means of the pivoting movement, objects which have been classified as good parts in dependence upon the respective previously determined category within the classification for the conveyed objects.

In accordance with a further preferred embodiment, the pivoting movement of the diversion element is adapted to the type of the objects to be sorted by means of an adjustment of at least one, preferably all, of the following parameters of the pivoting movement: (i) a measure of the acceleration of the diversion element, or for the force causing this; (ii) a measure of the final velocity of the diversion element which is reached after acceleration has taken place and before the diversion element makes contact with the object which is to be removed; (iii) a measure for determining the time for the start of the pivoting movement as a function of a previously detected position, along the conveying path, of the object which is to be removed; (iv) a measure of the maximum deflection which occurs during the pivoting movement from an initial position of the diversion element.

In accordance with a further preferred embodiment, the method also comprises a further step of detecting the objects conveyed along the conveying path to the removal unit. For the selective removal of an object, the diversion element is pivoted into the conveying path as a function of a trigger signal characterizing the detection of the object and as a function of the assigning of a category to the object within the classification.

In accordance with a further preferred embodiment, the method comprises the further steps of: detecting whether an object which is intended to be removed in accordance with it having been assigned a category within the classification has, after reaching the diversion element, been correctly removed from the conveying path in accordance with at least one predetermined criterion, and outputting a test signal which indicates a correct removal and/or that a removal of the object from the conveying path has not taken place correctly.

In accordance with a further preferred further development, a frequency of occurrence of the test signals is determined on the basis of the test signals, and if the frequency of occurrence exceeds a predetermined tolerance threshold, an error signal is output.

In accordance with a further preferred embodiment, the method comprises the further steps of: detecting a measure of the deflection of the diversion element and outputting a corresponding position signal; and returning the diversion element to an initial position on the basis of the position signal, from which initial position its respective pivoting movements for selectively removing objects from the conveying path take place.

In accordance with a further preferred embodiment, the method comprises the further step of: aligning the objects conveyed towards the diversion element along an alignment line extending along the conveying path.

In accordance with a further preferred embodiment, 20 or more, preferably 25 or more, of the objects are sorted per second by means of the selective removal taking place in dependence on the assigning, to the objects, of a category within the classification. This embodiment is particularly achievable for coins with a weight of 3 grams or less and with a diameter of 20 mm or less.

In accordance with a further preferred embodiment, the selective removal is followed by at least one further selective removal of individual objects conveyed along the conveying path, in dependence upon at least two classes of the assigning of categories of the classification previously determined for the respective objects.

Further advantages, features and possibilities of application of the present invention result from the following detailed description in connection with the figures.

In the figures.

In the following figures, the same reference signs are used throughout for the same or corresponding elements of the invention.

Figure 1:
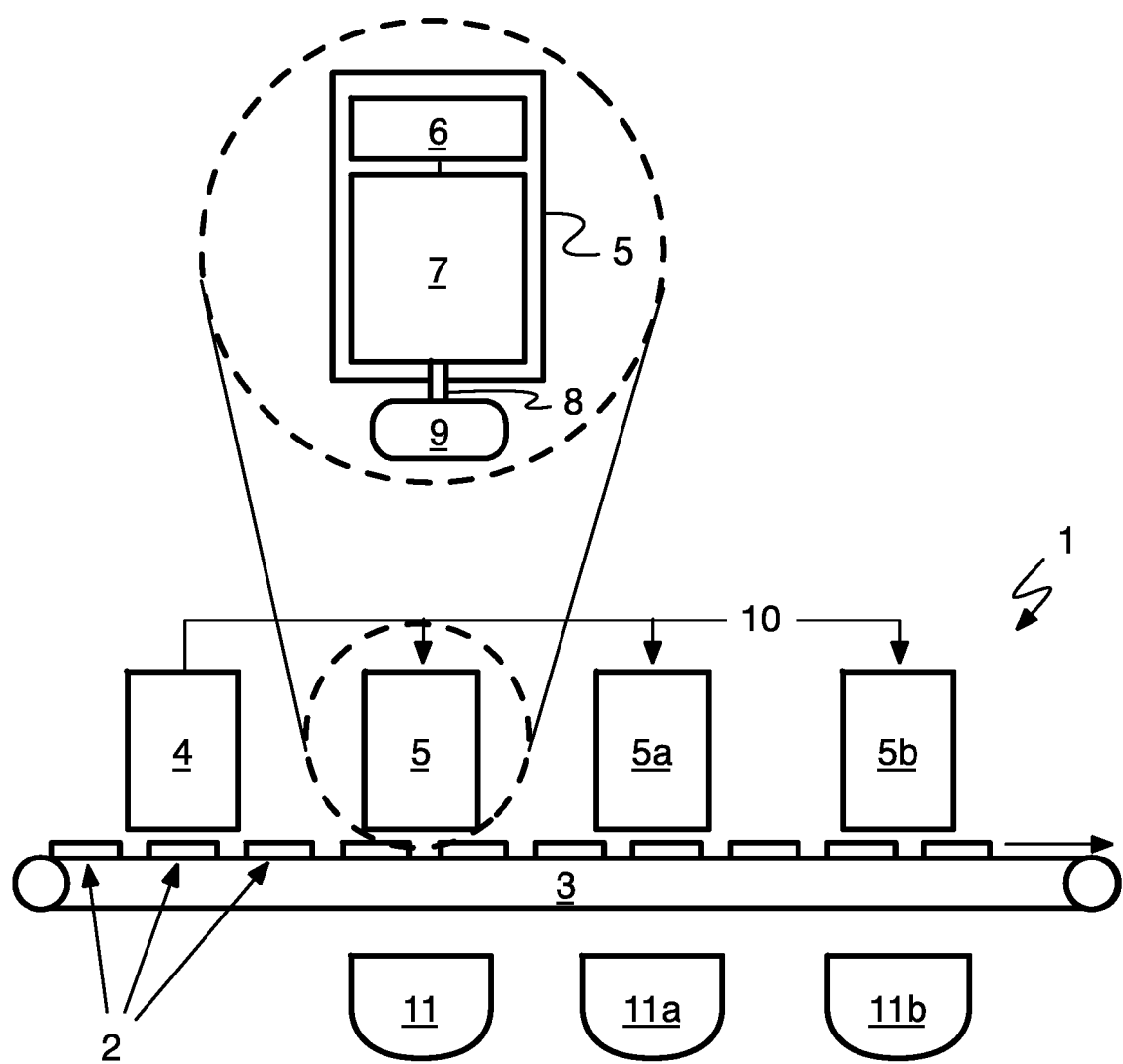
FIG. 1 shows a schematic block diagram of a device for sorting disc-shaped objects, in particular coins, in accordance with a preferred embodiment of the invention.

First, in order to explain the principle structure of the device in accordance with the invention, reference is made to FIG. 1 and the preferred embodiment shown there. The illustrated device 1 for sorting disc-shaped objects 2, in particular coins, comprises a conveying device 3, which in particular—as shown—can be constructed by means of a conveyor belt or transport belt. The transport device 3 serves to transport the already separated objects 2 serially along a corresponding conveying path to different stations of the device 1. An inspection unit 4 is provided as a first station, which, by means of one or more sensors, detects each of the objects 2 conveyed on the conveying device 3 and inspects them with regard to at least one criterion in order to assign, to the respective object 2, a category within a classification which distinguishes between good parts and defective parts. In the simplest case, the classification has only two classes, one for good parts and one for defective parts. In the present case of multiple removal, however, it is useful for the classification to have more classes, in this case preferably four. The at least one criterion according to which the objects 2 are classified as good parts or defective parts can refer in particular to whether the corresponding object 2 is free of damage or genuine or corresponds to a given object type. If the objects 2 are specifically coins, the at least one criterion may be in particular be suitable, either in addition or alternatively, for distinguishing between different varieties and/or denominations, which allows the coins to be sorted accordingly.

As a further station along the conveying path, a (first) removal unit 5 is provided, which is connected, as regards signal communication, to the inspection unit 4 via a communication path 10 and, via this, receives the categories of the objects 2 within the classification, as assigned and communicated by the inspection unit 4. For the purpose of illustration, the removal unit 5 is shown again in greater detail in the upper part of FIG. 1. The removal unit 5 comprises a servo motor 7 which can be controlled by means of a control unit 6 and with which a diversion element 9 in the form of a cam is arranged via the driven shaft 8 of the servo motor. The control unit can selectively be constructed as part of the removal unit as shown in FIG. 1, or separate from this (not shown). The diversion element 9 is configured to be caused to perform a pivoting movement when the servo motor 7 is controlled accordingly by the control unit 6, by means of which pivoting movement it reaches into the conveying path and comes into contact with an object 2 which is present there and which is to be removed, in order to transfer a mechanical momentum to this and thus to remove it from the conveying path. A collecting container 11 is assigned to the removal unit 5, which collecting container 11 is arranged in such a way that it can catch and collect the objects 2 which have been removed by means of the removal unit 5.

If it is detected, at the inspection unit 4, during operation of device 1 that a certain object 2 is to be classified as a good part in accordance with the classification, this is communicated via the communication path 10 to the removal unit 5, whereupon the control unit 6 of the latter controls the servo motor 7 in such a way that this causes the diversion element 9 to perform a pivoting movement for removal of the object 2 from the conveying path. The object 2 which has been removed is caught in the collecting container 11 and is collected together with other good parts which have been removed before or which are removed afterwards. Such objects 2, which on the other hand were not classified by the inspection unit 4 as good parts defined in relation to the removal unit 5 in accordance with the classification, pass the removal unit 5 along the conveying path without removal of the corresponding object 2. In the embodiment shown in FIG. 1, two additional removal units 5a and 5b, each with a corresponding collecting container 11a and 11b, are optionally provided as additional stations. Preferably, but not necessarily, the structure and function of these additional removal units correspond to those of the first removal unit 5. In the present example embodiment, the objects 2 are classified by the inspection unit 4 into four different quality classes, so that each of the three removal units 5, 5a and 5b is assigned to one of these quality classes and the removal of the objects 2 is carried out in accordance with these three quality classes. The remaining fourth quality class is not assigned to any of the removals and thus relates to those objects 2 that remain on the conveying device 3 after passing through the last removal unit 5b. These can optionally also be received and collected in a corresponding collection container (not shown) at the end of the conveying path. The different quality classes could, for example, relate to the degree or type of damage or, in the case of coins in particular, to their nominal value or type.

Figure 2:
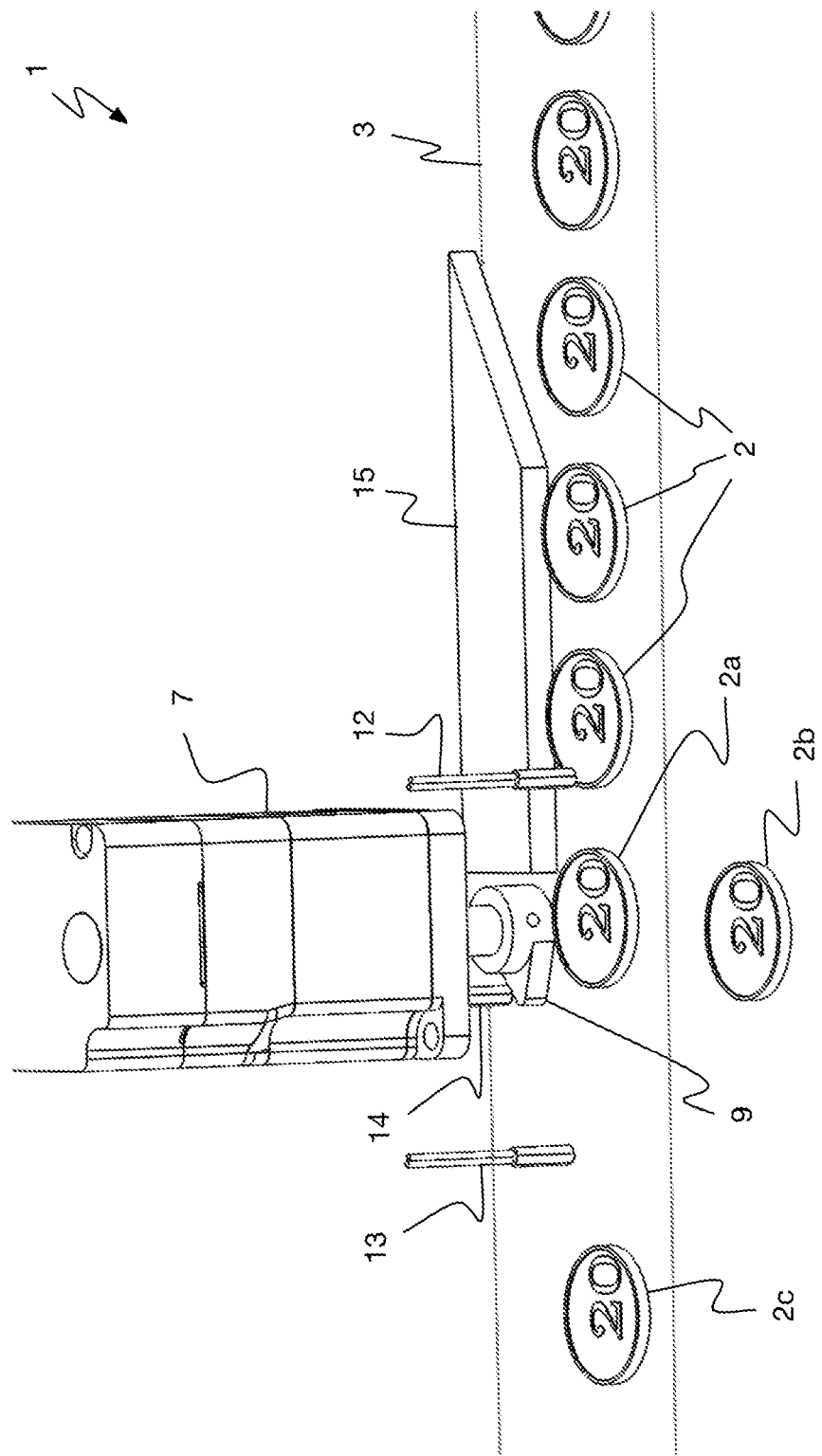
FIG. 2 shows a device for sorting disc-shaped objects in accordance with a preferred embodiment of the invention with a conveying device and a removal unit, in a perspective plan view looking towards the top of the device.

FIG. 2 shows a device in accordance with the invention with a conveying device 3 constructed as a conveyor belt and a removal unit 5 in accordance with a preferred embodiment of the invention in a perspective plan view looking toward its top. In this case the objects 2 are coins in particular, with a nominal value of 20, for example 0.20 €. The conveying direction of the coins along the conveying direction extending along the center of the conveyor belt runs from right to left in the example of FIG. 2.

After passing through the inspection unit (not shown), the coins reach an alignment device 15 in the form of a guide plate which is formed diagonally, which has the effect of aligning the coins with a straight edge of the guide plate adjacent to the diagonal side along the conveying direction in order to at least largely avoid a deviation of the position of the coins with respect to the direction running perpendicular to the conveying direction in the plane of the conveyor belt.

Following the alignment device, a trigger sensor 12 is provided for detecting the arrival of an object 2 conveyed along the conveying direction, which may in particular be an optical sensor. The trigger sensor 12 is arranged to send, when the arrival of an object 2 has been detected, a corresponding trigger signal to the control unit 6 of the removal unit 5, of which only the servo motor 7 is shown here for the sake of simplicity. The control unit 6 is arranged to subsequently control the servo motor 7 in such a way that it causes the diversion element 9 in the form of a cam to perform a pivoting movement after a predetermined period of time has elapsed after the trigger signal has been received, in order to remove the coin 2a, which in the meantime has arrived at the diversion element 9, if this coin has previously been classified as a good part. The coin 2b, which is also shown, has already been removed before. The coin 2c has passed the removal unit without having been removed. As regards further details of the operation of the device, reference is made to the subsequent explanation of the method in accordance with the invention.

In addition, the device comprises a test sensor 13 which, in relation to the conveying direction, is arranged downstream of the diversion element 9. The test sensor 13 is intended to detect coins 2 which, at its position, are still located on the conveyor belt 3, and to send corresponding test signals to the control unit 6. In this way it can be detected whether a coin 2a which was actually intended for removal has erroneously not been removed even though it had previously been classified as a good part.

In addition, a position sensor 14 is provided in the region of the diversion element 9, which position sensor 14 serves to detect the current deflection of the diversion element 9. In a simple version, the position sensor 14 is only constructed to detect whether the diversion element 9 is in a defined initial position (as shown in FIG. 2). With the help of the position sensor, and in conjunction with the control unit 6, the servo motor 7 and thus the diversion element 9 coupled to it can be transferred to the initial position when the device 1 is being initialized, in order to create a defined initial situation for the subsequent operation of the device 1 for sorting objects or coins 2.

Figure 3:
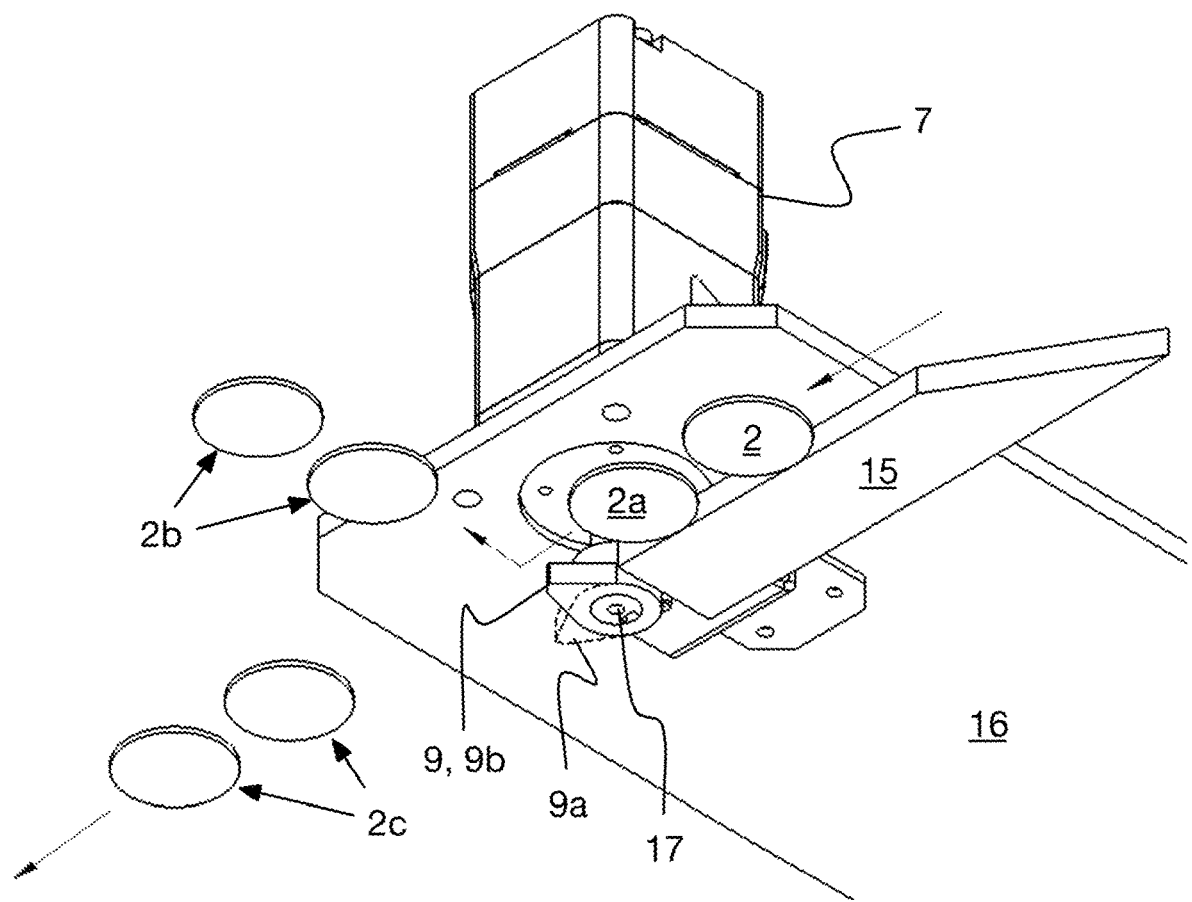
FIG. 3 shows the same device as FIG. 2, but in a perspective plan view looking towards its lower side, wherein the conveying device has not been illustrated in order to enable the removal unit to be seen.

FIG. 3 shows the same device in accordance with the invention as FIG. 2, but in a perspective plan view looking towards its lower side. The conveying device has not been illustrated in order to enable the removal unit to be seen. The objects or coins 2, 2a, 2b and 2c, which appear to be floating freely, actually lie accordingly on the conveyor belt 3. In this view, the initial position 9a of the diversion element 9, which is shown in dashed lines, as well as its position 9b after pivoting, shown by means of continuous lines, are shown in detail.

The diversion element 9 is arranged offset with respect to the alignment line of the coins defined by the guide plate 15 in such a way that, during its pivoting movement, a non-zero deflection from its initial position must first take place before the diversion element can come into contact with an object which is to be removed and which is aligned in this way, in order for the mechanical momentum to be transferred. In this way, unintentional deflections of objects or coins 2 not intended to be removed in accordance with their having been assigned a category within the classification, caused by contact with the diversion element, are avoided in a simple manner. The objects or coins 2c are parts which have been classified as defective parts and which have therefore not been removed by the removal unit 5 and which have remained on the conveyor belt 3. In addition, FIG. 3 shows the axis of rotation 13 of the diversion element 9, which coincides with the driven shaft 8 of the servo motor 7, as well as a plate 16 on which the removal unit and the alignment device 15 can be mounted. The plate 16 and the removal unit 5 can preferably be arranged on an adjustable carriage and can preferably be displaceable along and/or perpendicular to the conveying device 3. This ability to be displaced can in particular be configured in dependence upon the characteristics of the objects to be sorted.

Figure 4:
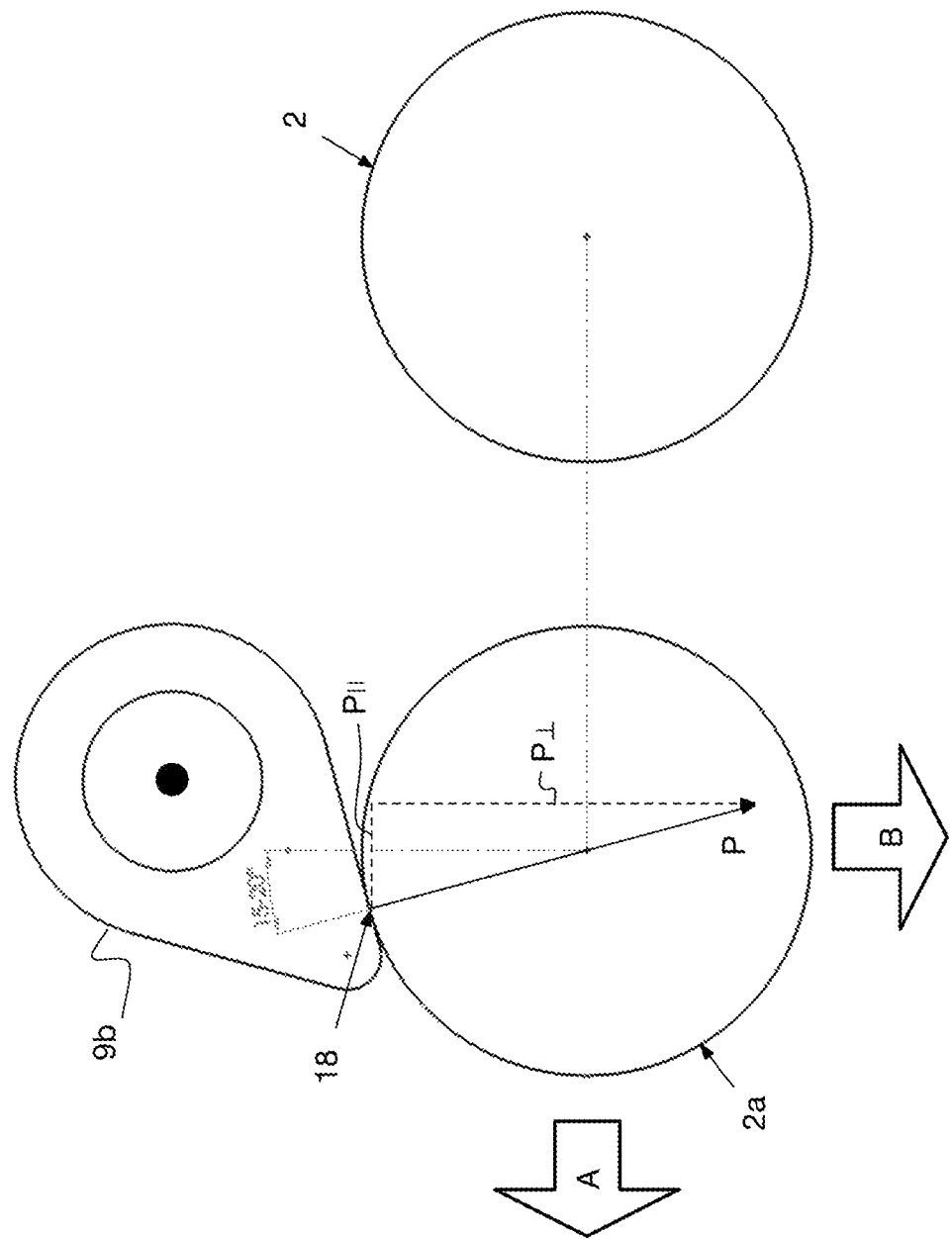
FIG. 4 shows a detailed view illustrating the transfer of momentum from the diversion element to an object which is to be removed, in particular a coin, in the device of FIGS. 2 and 3.

In order to illustrate the transfer of momentum from the diversion element 9 to an object 2a to be removed taking place at the device of FIGS. 2 and 3, FIG. 4 shows a corresponding detailed view. The conveying direction A of the objects 2 again runs from right to left and at present the object 2a has reached the diversion element 9, which, at the time of the momentum transfer, as shown, is already in a deflection position 9b and is in contact 18 with the object 2a at a contact surface. Preferably, the diversion element or its surface portion which is intended for the contact has a height in a direction parallel to the axis of rotation which corresponds at least to the corresponding height or thickness of the objects 2 to be sorted, so that the area of the contact is as large as possible, which is advantageous for avoiding damage. In addition, the material of the diversion element 9 can be elastic at least in the region of this surface portion and have a modulus of elasticity which is lower than that of the disc-shaped objects to be sorted (in particular at their circumference). The diversion element 9 carries out a pivoting movement in a counterclockwise direction about the axis of rotation 13 and transfers, via the contact 18, a mechanical momentum P to the object 2a for the purpose of removing the object 2a. Immediately before the contact 18 is established, this momentum P, in relation to the direction of movement of the object 2a, which corresponds to the conveying direction A, has both a momentum component $P\perp$ which runs perpendicular to the conveying direction or the object movement as well as a momentum component $P\|$ which runs anti-parallel thereto. By means of the application of the additionally transferred momentum P to the momentum P already present along the conveying path as a result of the conveying, a resulting momentum, or a changed direction of movement B, of the object 2a to be removed is produced, which, with the appropriate configuration of the removal process, can run in particular perpendicular to the conveying direction. In this way, the kinetic energy of the object 2a which kinetic energy is already present before the transfer of momentum can be used for the removal without all of the kinetic energy required for this having to be expended by the removal unit 5.

Preferably, the pivoting movement can be adjusted, for example by means of its acceleration and final velocity, its time of triggering and/or its maximum deflection angle as a parameter, so that an optimum adjustment and adaptation to the type of the objects 2 to be sorted is possible in terms of energy efficiency and reliability of the removal.

In particular, the diversion element and its pivoting movement can be configured in such a way that in the event that the disc-shaped objects to be sorted have an at least substantially circular geometry, as is regularly the case with coins, the contact 18 occurring during removal between the diversion element 9 and the object 2a to be removed extends over no more than a quarter-circle segment of the circular circumference of the object.

Figure 5:
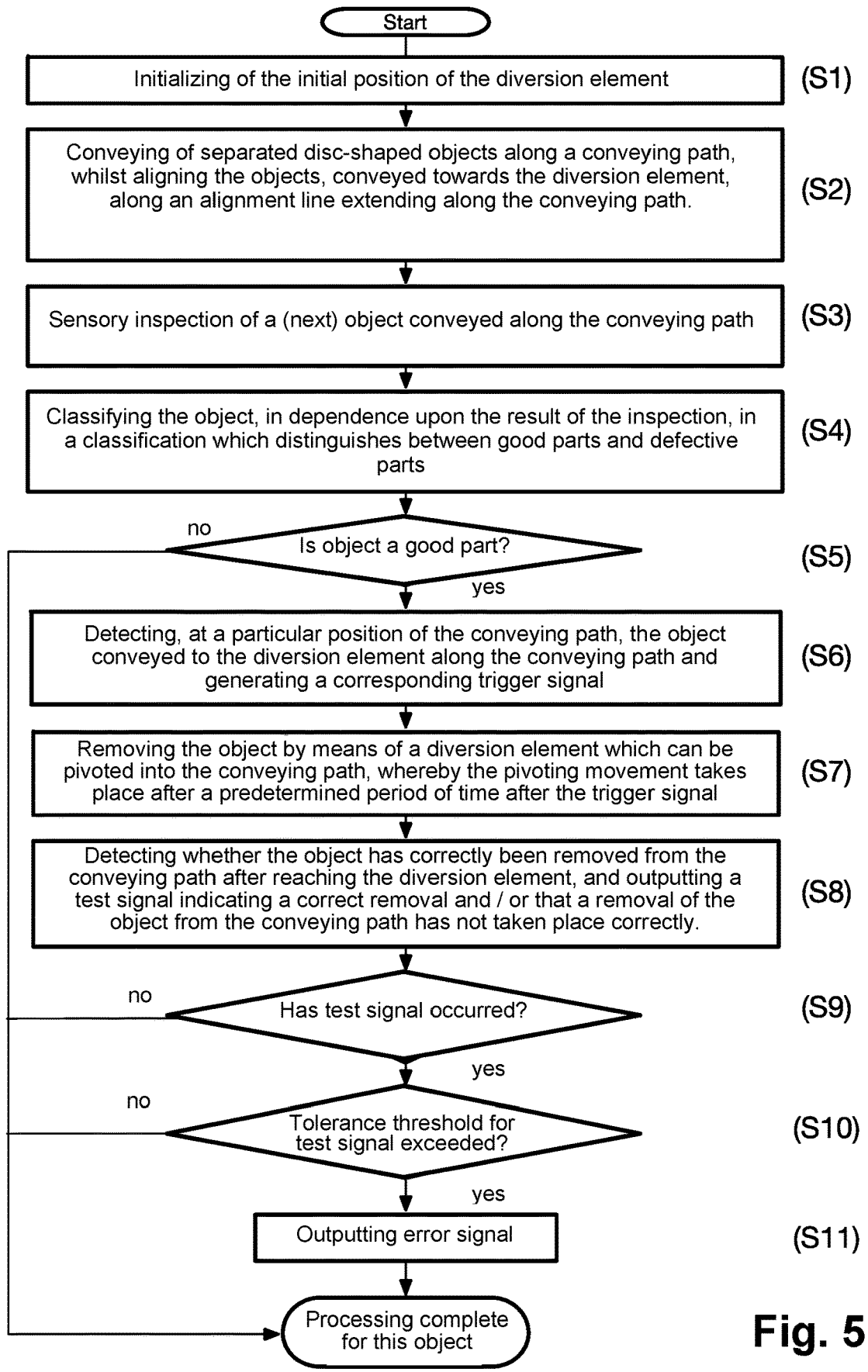
FIG. 5 shows a flow chart illustrating a preferred embodiment of the method in accordance with the invention.

A flow chart is shown in FIG. 5 to further illustrate the mode of operation of the device in accordance with the invention, as well as the method in accordance with the invention in accordance with preferred embodiments. Here, references are made, by way of example, to the embodiments of device 1 which have been described above, whilst this should not be understood in a limiting sense. On the basis of the flow diagram, an example sequence from the start-up of the device to the sorting of a first object 2 is described below.

The method begins with the start-up of the device 1, for example when it is switched on, after which an initialization step S1 follows so as to bring the diversion element 9 into its initial position 9a. For this purpose, the current position of the diversion element 9 can be detected, in particular by means of a position sensor 14, and reported back to the control unit 6 of the removal unit 5 in order to enable it to transfer the diversion element 9 to the predetermined initial position 9a by means of a corresponding activation of the motor 7, insofar as the diversion element 9 is not already there.

In a subsequent step S2, which in practice is typically performed in a continuous manner, the already separated disc-shaped objects 2, in particular coins, are conveyed along a conveying path, which can be implemented in particular by a conveying device such as a conveyor belt 3. As a result of this the individual objects 2 are preferably aligned along an alignment direction, as already described above in connection with the alignment device 15. In a subsequent step S3, the object 2 is inspected with the help of at least one sensor, so that, in a further step S4, in dependence upon the result of the inspection, a category is assigned to the object 2 within a classification that distinguishes between good parts and defective parts.

Then, in a further step, S5, a check is carried out as to whether the object 2 has been classified as a good part according to the classification. If this is not the case (S5—no), the processing of the method for this object 2 is already complete and the object passes the diversion element 9 without being removed during the course of this. Otherwise (S5—yes), the method proceeds to a step S6, in which the object 2 is detected at a certain point along the conveying path, which is still upstream of the diversion element 9, and a corresponding trigger signal is generated and output.

In a further step S7, a removal of the object 2 is then carried out by means of the diversion element 9, which can be pivoted into the conveying path, whereby its pivoting movement takes place, in particular is triggered, after a predetermined period of time after the trigger signal. This period of time is preferably adjustable as a parameter in order to enable an optimum adjustment of the time and the direction of the transfer of momentum between the diversion element 9 and the object 2.

Finally, in a further step S8, a detection takes place, in particular by means of a corresponding test sensor 13, as to whether object 2, which is intended to be removed based on its classification as a good part, has actually correctly been removed from the conveying path or not. The result of this test can be indicated by a test signal, at least in the event that the removal has not correctly been carried out. In the subsequent step S9 a check is accordingly carried out as to whether such a test signal has occurred or whether an incorrect removal is indicated and thus that an error regarding the removal is present. If this is not the case (S9—no), the processing for this object 2 is complete. Otherwise (S9—yes) a further check can optionally be carried out to determine whether the total number (absolute frequency) of test signals which have occurred since a corresponding counter was reset exceeds a predetermined tolerance threshold. If this is not the case (S10—no), the processing for this object 2 is complete. Otherwise (S10—yes), a fault notification is first output in an intermediate further step S11. Alternatively, a relative frequency related to the throughput can also be determined and checked against a correspondingly defined tolerance threshold.

The output of the fault message can in particular take place via a user interface by means of which the occurrence of the fault can be signaled to an operator, for example via a display device and/or an acoustic signal.

In practice, the method (apart from the original initialization step S1) runs in parallel and with a time delay simultaneously for a plurality of the objects 2 to be sorted, so that, for example, at the time of the removal of a first object 2a, a further object 2 is being inspected in accordance with step S3 and yet further objects 2 are already being transported along the conveying path in accordance with step S2.

While at least one example embodiment has been described above, it should be noted that there are a large number of variations. It should also be noted that the example embodiments which have been described only represent non-limiting examples, and it is not intended to thereby limit the scope, the applicability or the configuration of the devices and methods described here. Rather, the preceding description will provide the skilled person with instructions for the implementation of at least one example embodiment, it being understood that various changes can be made in the functionality and the arrangement of the elements described in an example embodiment, without deviating from the subject matter respectively defined in the appended claims, as well as its legal equivalents.

LIST OF REFERENCE SIGNS 1 device for sorting disc-shaped objects
2 disc-shaped objects, in particular coins
3 conveying device, in particular conveyor belt
4 inspection unit
5 (first) removal unit
5a, 5b further removal units
6 control unit, at the same time evaluation unit for test signals
7 servo motor
8 driven shaft
9 diversion element
10 communication path
11 collecting container for (first) removal unit
11a, b collecting container for the further removal units
12 trigger sensor
13 test sensor
14 position sensor
15 alignment device, in particular guide plate
16 plate
17 axis of rotation of the diversion element
18 contact between diversion element and object
A conveying direction
B direction of removal
P transferred mechanical momentum
$P_\perp$ momentum component of P perpendicular to the object movement
$P_\parallel$ momentum component of P anti-parallel to the object movement

What is claimed is:
1. A device for sorting disc-shaped objects, in particular coins, comprising:
a conveying device which is configured to convey individual disc-shaped objects along a conveying path; and a removal unit with a pivotable diversion element for the selective removal of individual ones of the objects conveyed along the conveying path in dependence upon an assigning, to the objects, of a respective previously determined category within a classification which distinguishes between good parts and defective parts;

wherein the diversion element is arranged to be pivoted into the conveying path by means of a drive in such a way that, for the removal of an object, it transfers a mechanical momentum to the object to be removed by means of the pivoting movement, which mechanical momentum has, with respect to the direction of movement of the object at the time of the momentum transfer, both a momentum component which is directed perpendicular thereto, as well as a momentum component which is directed anti-parallel thereto, which momentum components are chosen in such a way that the direction of movement of the object is changed by the momentum and the object is thereby removed from the conveying path;

wherein the removal unit is configured to effect a sorting of good parts and defective parts in such a way that only those of the conveyed objects are removed by means of the diversion element which have been classified as good parts according to the classification;

wherein the diversion element is configured in such a way that its pivoting movement takes place about a real or virtual axis and that the surface portion of the diversion element which is intended for the transfer of momentum to the disc-shaped objects has, in a direction parallel to the axis, a height which is at least equal to the thickness of the disc-shaped objects which are intended for sorting so that, during the transfer of the mechanical momentum from the diversion element to the object that is to be removed, there is contact between the diversion element and the object over the entire thickness of the latter, and wherein the device further comprises a position sensor which is configured to detect a measure of the deflection of the diversion element and to output a corresponding position signal, wherein the device is configured to return the diversion element to a predefined initial position on the basis of the position signal, from which predefined initial position its respective pivoting movements for the selective removal of objects from the conveying path take place.

2. The device in accordance with claim 1, further comprising:

an inspection unit which is arranged along the conveying path upstream of the diversion element and is arranged to inspect each of the objects conveyed along the conveying path using a sensor and, depending on the result of the inspection, to assign, to the conveyed objects, a category within the classification and to communicate these assigned categories to the removal unit.

3. The device in accordance with claim 1, wherein an electric motor is provided to drive the diversion element, with the driven shaft of which the diversion element is coupled.

4. The device in accordance with claim 3, wherein the electric motor is a servo motor and the removal unit further comprises a control unit which is arranged to control the servo motor by means of corresponding control signals in order to cause the diversion element driven by the servo motor to remove objects by means of the pivoting movement, which objects have been selectively classified as good parts, depending on the assigning of a category previously determined for the conveyed objects within the classification.

5. The device in accordance with claim 4, wherein the control unit, in order to adapt the pivoting movement of the diversion element to the type of the objects to be sorted, can be configured in such a way that at least one of the following parameters of the pivoting movement can be adjusted:

a measure of the acceleration of the diversion element, or of the force which causes this;

a measure of the final velocity of the diversion element which has been reached after acceleration has taken place and before the diversion element has made contact with the object to be removed;

a measure for determining the point in time for the start of the pivoting movement as a function of a previously detected position, along the conveying path, of the object to be removed;

a measure of the maximum deflection occurring during the pivoting movement from an initial position of the diversion element.

6. The device in accordance with claim 1, further comprising a trigger sensor that is configured to detect objects which are being conveyed along the conveying path to the removal unit and, if an object is detected, to output a trigger signal to the removal unit that indicates the detection;

wherein the removal unit is configured, to pivot the diversion element into the conveying path in dependence upon the trigger signal and the assigning of a category within the classification to an object in order to selectively remove the object.

7. The device in accordance with claim 1, further comprising a test sensor which is configured to detect whether an object which is intended to be removed in accordance with it having been assigned a category within the classification has, after reaching the diversion element, been correctly removed from the conveying path in accordance with at least one predetermined criterion and to output a test signal which indicates a correct removal and/or that a removal of the object from the conveying path has not taken place correctly.

8. The device in accordance with claim 7, further comprising an evaluation unit which is arranged to determine a frequency of occurrence of the test signals on the basis of the test signals output by the test sensor, and to output a fault signal if the frequency of occurrence exceeds a predetermined tolerance threshold.

9. The device in accordance with claim 1, wherein the diversion element has the shape of a cam.

10. The device in accordance with claim 1, wherein, at least on its surface section intended for the transfer of momentum to the objects, the diversion element has a contour that is free of edges, corners and projections.

11. The device in accordance with claim 1, wherein the surface portion of the diversion element which is intended for the transfer of momentum to the objects to be removed is made of a material whose modulus of elasticity is lower than that of the objects intended for sorting.

12. The device in accordance with claim 1, wherein the diversion element is configured in such a way that its surface section which is intended for the transfer of momentum to the objects already has a movement component directed against the conveying direction immediately before the contact with an object which is to be removed.

13. The device in accordance with claim 1, wherein the maximum deflection angle of the diversion element from its initial position achieved during the pivoting movement of the diversion element is at most 40 degrees, preferably at most 30 degrees, particularly preferably at most 20 degrees.

14. The device in accordance with claim 1, wherein the device is arranged to sort 20 or more of the objects, preferably 25 or more of the objects, per second.

15. The device in accordance with claim 1, wherein at least one further removal unit is provided along the conveying path downstream of the removal unit for the selective removal of individual ones of the objects conveyed along the conveying path, in dependence upon at least two classes of the assigning of categories of the classification previously determined for the respective objects.

16. The device in accordance with claim 1, wherein the conveying device has an alignment device for aligning the objects which have been conveyed to the diversion element along an alignment line extending along the conveying path, and the diversion element is arranged offset with respect to this alignment line in such a way that, during its pivoting movement, a deflection from its initial position which is different from zero must first take place before the diversion element can come into contact with an object which is to be removed and which is aligned in this way in order to transfer the mechanical momentum.

17. A method of sorting disc-shaped objects, in particular coins, comprising the following steps:
  conveying individual disc-shaped objects along a conveying path; and
  selectively removing, by means of a pivotable diversion element, certain ones of the objects conveyed along the conveying path, in dependence upon a prior assigning, to the objects, of a category within a classification, which distinguishes between good parts and defective parts;
  wherein, for the removal of an object, the diversion element is pivoted into the conveying path by means of a drive in such a way that it transfers a mechanical momentum to the object to be removed by means of the pivoting movement, whose direction with respect to the direction of movement of the object at the time of the transfer of momentum has both a momentum component which is directed perpendicular as well as a momentum component which is directed anti-parallel with respect to the direction of movement of the object, which momentum components are chosen in such a way that the direction of movement of the object is changed by the momentum and that this is thereby removed from the conveying path;
  wherein a sorting of good parts and defective parts is carried out in such a way that only those of the conveyed objects are removed by means of the diversion element which have been classified as good parts in accordance with the classification,
  wherein the diversion element is configured in such a way that its pivoting movement takes place about a real or virtual axis and that the surface portion of the diversion element which is intended for the transfer of momentum to the disc-shaped objects has, in a direction parallel to the axis, a height which is at least equal to the thickness of the disc-shaped objects which are intended for sorting so that, during the transfer of the mechanical momentum from the diversion element to the object that is to be removed, there is contact between the diversion element and the object over the entire thickness of the latter, and
  wherein the method further comprises:
    detecting a measure of the deflection of the diversion element and outputting a corresponding position signal; and
    returning, on the basis of the position signal, the diversion element (9) to an initial position from which its respective pivoting movements for selectively removing objects from the conveying path take place.

18. The method in accordance with claim 17, comprising the further steps of:
  a sensory inspection of the respective objects conveyed along the conveying path; and
  an assigning of a category to the conveyed objects, depending on the respective result of their inspection, in the classification; and
  a communication of the classification category to a controller of the diversion element.

19. The method in accordance with claim 18, comprising the further step of:
  detecting the objects conveyed along the conveying path to the removal unit;
  wherein, for the selective removal of an object, the diversion element is pivoted into the conveying path as a function of a trigger signal characterizing the detection of the object and as a function of the assigning of a category to the object within the classification.

20. The method in accordance with claim 17, wherein a servo motor is used to drive the diversion element, which servo motor is controlled by means of appropriate control signals in such a way that the diversion element is caused to selectively remove, by means of the pivoting movement, objects which have been classified as good parts in dependence upon the respective previously determined category within the classification for the conveyed objects.

21. The method in accordance with claim 20, wherein the pivoting movement of the diversion element is adapted to the type of objects to be sorted by means of an adjustment of at least one of the following parameters of the pivoting movement:
  a measure of the acceleration of the diversion element or of the force causing this;
  a measure of the final velocity of the diversion element which is reached after acceleration has taken place and before the diversion element makes contact with the object which is to be removed;
  a measure for determining the time for the start of the pivoting movement as a function of a previously detected position, along the conveying path, of the object which is to be removed;
  a measure of the maximum deflection which occurs during the pivoting movement from an initial position of the diversion element.

22. The method in accordance with claim 17, comprising the further steps of:
  detecting whether an object which is intended to be removed in accordance with it having been assigned a category within the classification has, after reaching the diversion element, been correctly removed from the conveying path in accordance with at least one predetermined criterion, and
  outputting a test signal which indicates a correct removal and/or that a removal of the object from the conveying path has not taken place correctly.

23. The method in accordance with claim 22, wherein a frequency of occurrence of the test signals is determined on the basis of the test signals, and if the frequency of occurrence exceeds a predetermined tolerance threshold, an error signal is output.

24. The method in accordance with claim 17, wherein 20 or more, preferably 25 or more, of the objects are sorted per second by means of the selective removal taking place in dependence on the assigning, to the objects, of a category within the classification.

25. The method in accordance with claim 17, wherein the selective removal is followed by at least one further selective removal of individual objects conveyed along the conveying path, in dependence upon at least two classes of the assigning of categories of the classification previously determined for the respective objects.

26. The method in accordance with claim 17, comprising the further step of:
   aligning the objects conveyed towards the diversion element along an alignment line extending along the conveying path.

\* \* \* \* \*